INVENTOR.
FRANCIS W. LEWIS
NELS R. NELSON
BY
Drummond & Cahill
ATTORNEYS

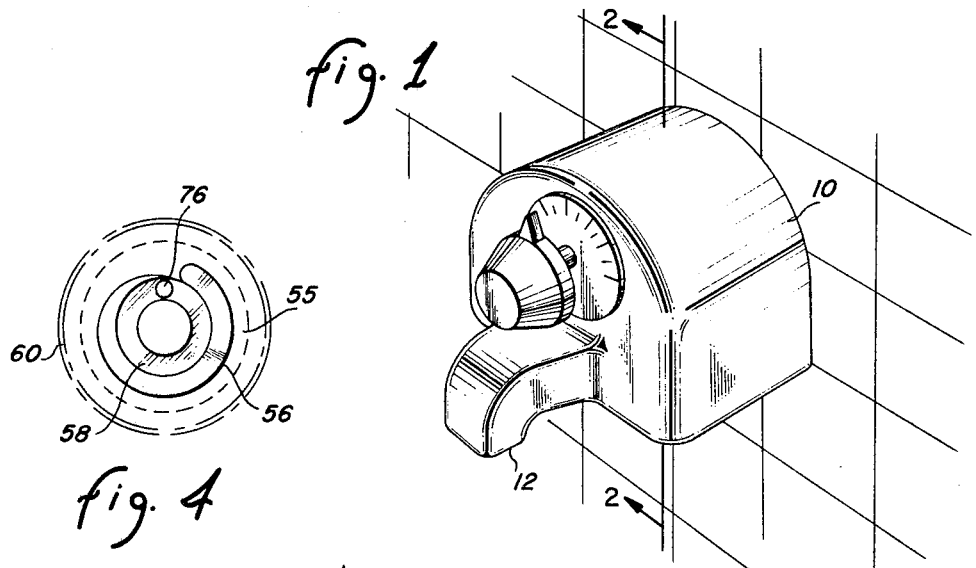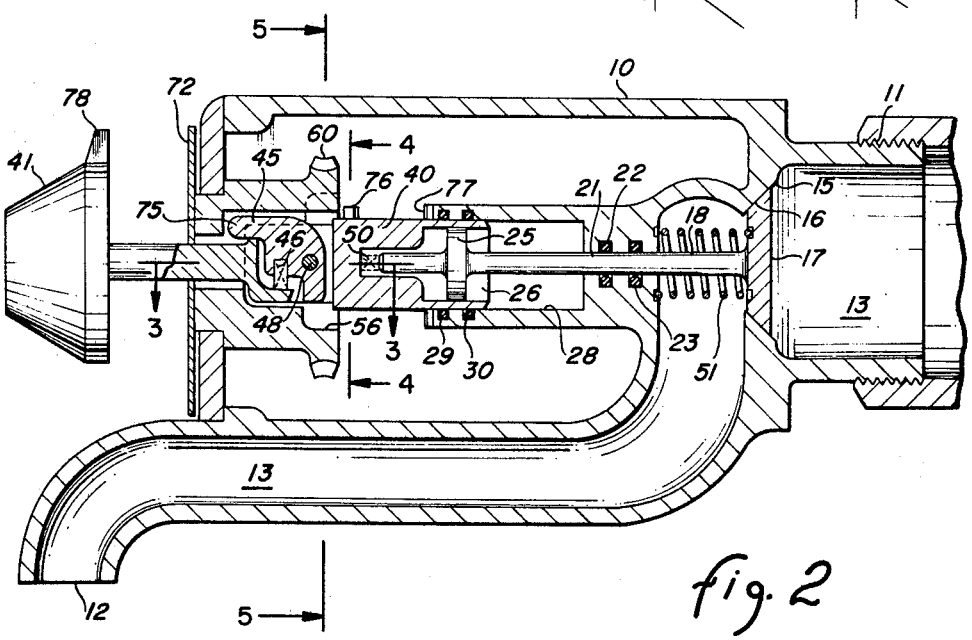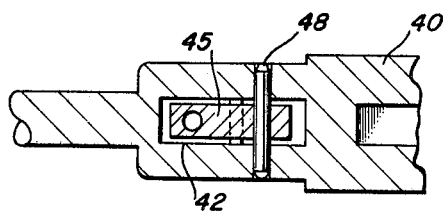

United States Patent Office 3,507,420
Patented Apr. 21, 1970

3,507,420
AUTOMATIC SHUT-OFF VALVE SYSTEM
Nels R. Nelson, 1221 E. Ocotillo 85014, and Francis
W. Lewis, 5120 N. 42nd Place 85018, both of
Phoenix, Ariz.
Filed Apr. 22, 1968, Ser. No. 723,161
Int. Cl. B67d 5/30
U.S. Cl. 222—20　　　　　　　　　　　　　8 Claims

ABSTRACT OF THE DISCLOSURE

An automatic shut-off valve system incorporating a valve opening dial that is locked in its open position through the utilization of a cam follower contacting an interior cam surface. The cam surface is rotated through gear teeth provided integrally therewith on the exterior in engagement with a worm driven by the shaft of a turbine extending into the passageway of the valve.

---

This invention pertains to shut-off valves, and more particularly, to valves designed to automatically shut off the liquid upon delivery of a predetermined volume thereof.

In numerous household applications, it is desirable to be able to measure a quantity of water without continuously monitoring the water flow. For example, with filling a bathtub, it is frequently desirable to be able to leave the immediate vicinity without concern about overflow. In numerous other instances, such as filling a sink or possibly in such applications as filling a trough for farming applications, it is also desirable to set a dial to a predetermined volume and leave the valve unattended, relying on its ability to shut off after the predetermined volume has been reached.

An attempt to achieve the functions above described has resulted in complicated timing structures utilizing a variety of time delay valve designs. These designs do not take into account the fluctuation of the water supply pressure, thus rendering the ultimate measurement of water volume substantially inaccurate. Timing mechanisms, in addition to their complexity, are frequently susceptible to corrosion when placed in a water valve environment, thereby reducing their reliability and expected lifetime.

It is therefore an object of the present invention to provide an automatic water shut-off valve utilizing a manually operable valve that may be locked in an open position to be closed upon the measurement of a predetermined volume of water passage.

It is another object of the present invention to provide an automatic water shut-off valve wherein the valve is opened and locked in its open position through the utilization of a spring-loaded cam follower that is caused to engage a rotating cam driven by a volume measuring device.

It is still another object of the present invention to provide an automatic water shut-off valve utilizing a turbine-type volume measuring device to drive a valve release mechanism to permit water pressure action on a valve to cause its closure after the passage of a predetermined volume.

These and other advantages of the present invention will become apparent to those skilled in the art as the description thereof proceeds.

Briefly, in accordance with the embodiment chosen for illustration, a valve housing is provided with a water passageway having a valve seat formed therein. A valve is positioned in the passageway having a valve stem extending therefrom into a position to permit axial movement of the stem and valve. A valve opening means, including a shaft, is positioned co-axially with the valve stem and is axially movable to cause the valve to open; the shaft may be rotated about its axis after axial movement to cause a spring-loaded cam follower to move transversely of the axis of the shaft into engagement with a camming surface of an internal cam. The cam is rotated through the expediency of gear teeth provided about the periphery thereof in engagement with a worm driven by a turbine extending into the water passageway. The rate of flow of the water in the passageway determines the rotation of the turbine and thus the speed with which the cam rotates to release the cam follower and attached valve opening shaft.

The present invention may more readily be described by reference to the accompanying drawings, in which:

FIGURE 1 is a perspective view of an automatic water shut-off valve system constructed in accordance with the teachings of the present invention.

FIGURE 2 is a sectional view of FIGURE 1 taken along line 2—2.

FIGURE 3 is a partial sectional view of FIGURE 2 taken along line 3—3.

FIGURE 4 is a partial sectional view of FIGURE 2 taken along line 4—4.

Figure 5:
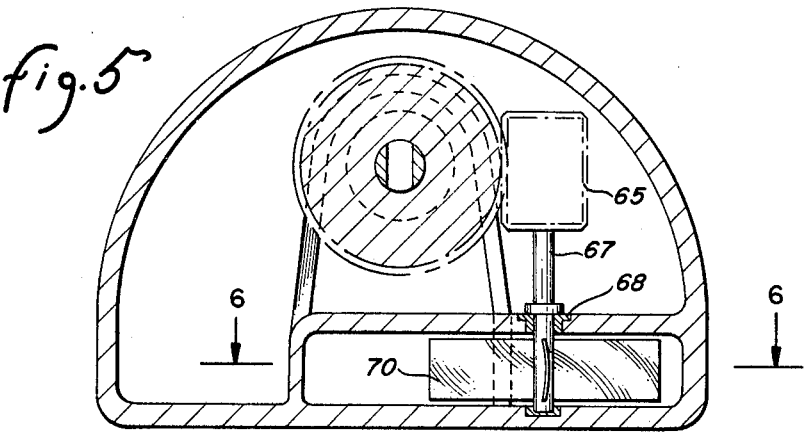
FIGURE 5 is a partial sectional view of FIGURE 2 taken along line 5—5.
Figure 6:
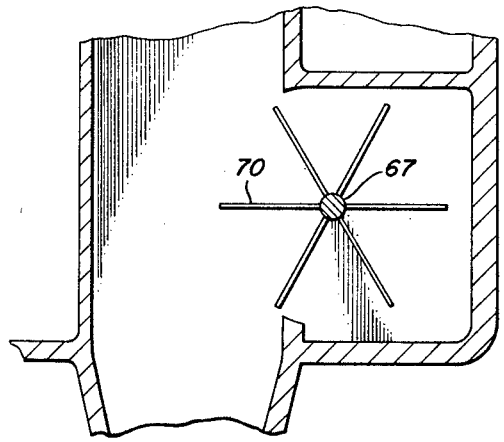
FIGURE 6 is a partial sectional view of FIGURE 5 taken along line 6—6.

Referring now to the drawings, a valve housing 10 is provided and is connected to a water supply (not shown) by any suitable means such as a threaded connection 11 commonly available in bath fixtures and the like. The housing includes a spout 12 located at the end of a water passageway 13. The passageway includes a valve seat 15 for co-operatively engaging a corresponding valve surface 16. The valve 17 and valve stem 18 are mounted for axial movement to permit the passageway 13 to be opened and closed accordingly. The valve stem 18 is axially movable through a bearing surface 21 utilizing a pair of O rings 22 and 23 to seal and prevent water from escaping from the passageway. The valve stem terminates in a piston 25 slidably mounted within a cylinder 26. The cylinder 26 is also slidably mounted within a stem guide 28 having O rings 29 and 30 therein.

A stem 40 (of which the cylinder 26 is a part) extends outwardly of the housing 10 and terminates in a knob 41. The stem is also provided with a slot 42 within which is pivotally mounted a cam follower 45 spring-biased by a coil spring 46. The cam follower 45 is pivoted about the pin 48.

The shaft 40 is in co-axial relationship to the valve stem 18 and is separated therefrom by the coil spring 50. An internal cam 55, including camming surface 56 is rotatably positioned co-axially with the shaft 40 and includes a cylindrical opening 58 therein to accommodate the shaft 40 and the cam follower 45. Worm gearing 60 is formed integrally about the periphery of the cam 55 and is in engagement with worm 65.

The worm 65 is mounted on a shaft 67 journalled in a bearing 68 and having turbine blades 70 secured thereto. The turbine blades extend into the water passageway 13 and present a partial obstruction to the flow of water therethrough. A calibrated dial 72 may be mounted on the exterior of the housing 10 to provide a reference for positioning the knob 41 in accordance with the desired flow of water to be permitted to flow through the system.

The operation of the automatic water shut-off valve system of the present invention may now be described. The valve 17 is forced into intimate contact with the valve seat 15 by the pressure of the water exerted on the head of the valve. The valve may be opened by depressing the knob 41, causing the shaft 40 to move to the right as seen in FIGURE 2, which in turn pushes on the valve 17 through the coil spring 50 and valve stem 18. A pre-load spring 51 is seated against the back of valve 17 to urge the latter against the pressure of the water acting on the valve face. The pre-load spring renders the valve readily openable without having to overcome the total force exerted by the pressure of the water on the valve face. When the valve is in its open position, the knob 41 may be rotated about its axis, thus permitting the spring 46 to cause the cam follower 45 to pivot about the pin 48. The cam follower 45 follows the surface of the interior cam 56 as the shaft 40 is rotated. The number of degrees of rotation of the knob 41 determines the number of degrees necessary for the rotation of the cam 55 to cause the cam follower 45 to disengage, as will become more apparent as the description follows.

Figure 7:
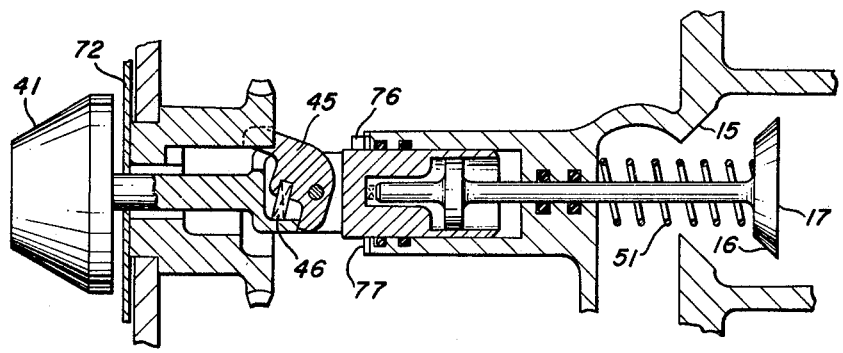
FIGURE 7 is a partial sectional view of the device of FIGURE 1 showing the same internal parts as FIGURE 2 in an operating position.

With the knob 41 rotated as previously described, the valve will be locked in an open position such as shown in FIGURE 7 wherein it may be seen that the cam follower 45 has locked the shaft 40 (and therefore the valve 17) in a position to the right. The water flowing through the passageway 13 impinges on the turbine blades 70, causing the shaft 67 and worm 65 to rotate. The worm 65, in engagement with the gear teeth 60 provided on the periphery of the internal cam 55, causes the cam to rotate. As the cam rotates, the camming surface 56 pushes the cam follower 45 to cause the latter to rotate about pivot pin 48 in a direction to compress the spring 46 and to force the cam follower out of contact with the camming surface 56. The force exerted by the water pressure on the valve 17 causes the shaft 40 to move to the left as seen in FIGURE 2 since the cam follower 45 is free to slide axially into the cylindrical opening 58 provided in the cam 55. It may be seen that the cam 45 includes an extension 75 that, in addition to acting as a cam follower, also extends into a detent 76 in the cam when the valve is in the closed position. The initial depression of the knob 41 disengages the portion 75 of the cam follower from the detent 76, permitting the knob to be rotated to a desired position representing a given volume of water. By further depressing the knob 41, the cam follower 45 is permitted to "snap" into engagement with the camming surface 56. The initial axial movement of the shaft 40 to disengage the cam follower from its associated detent permits the initial rotation of the knob 41 to establish a predetermined angle relationship between the cam and cam follower. Thus, when the shaft 40 is depressed a sufficient length to cause the cam and cam follower to come into operative engagement, a locking extension 76 comes into contact with a corresponding serrated locking edge 77 on the stem guide 28 to thereby prevent further rotation of the cam follower 45.

It may also be noted that the dial 72 is attached to the cam 55 and rotates therewith. In this manner, when the cam follower has been forced off the cam surface 56 and falls into locking detent 76, the pointer 78 on the knob 41 will be aligned with the zero reading on the dial and it will be unnecessary to reset the dial or knob for subsequent operations.

It will therefore be apparent to those skilled in the art that the present invention provides a means for permitting a predetermined volume of water to flow through a passageway without regard to the water pressure. Further, the volume may be selected in a convenient manner by setting a dial and may be repeatedly utilized without resetting the system after each use.

We claim:
1. An automatic liquid shut-off valve system comprising: a valve housing connected to a water source, said housing including a valve seat in a liquid passageway; an axially movable valve stem and valve, said valve having a surface for mating with said valve seat to thereby close said passageway, said stem and valve forced to a closed position by liquid pressure acting upon said valve; manual valve opening means for contacting said valve stem and urging said valve to an open position; releasable locking means connected to said valve opening means for temporarily maintaining said valve in said open position; and measuring means connected to said locking means extending into said liquid passageway responsive to the passage of a selected volume of liquid through said passageway for releasing said locking means; said valve opening means comprising a shaft mounted co-axially with said valve stem extending externally of said valve housing and having a valve open position and a valve closed position, said shaft extending further from said housing when in the valve closed position than when in the valve open position.

2. An automatic liquid shut-off valve system comprising: a valve housing connected to a water source, said housing including a valve seat in a liquid passageway; an axially movable valve stem and valve, said valve having a surface for mating with said valve seat to thereby close said passageway, said stem and valve forced to a closed position by liquid pressure acting upon said valve; manual valve opening means for contacting said valve stem and urging said valve to an open position; releasable locking means connected to said valve opening means for temporarily maintaining said valve in said open position; and measuring means connected to said locking means extending into said liquid passageway responsive to the passage of a selected volume of liquid through said passageway for releasing said locking means; said locking means including a spring-biased cam follower pivotally secured to said valve opening means responsive to axial opening movement of said valve stem for pivoting into a locking position, and including a rotatable cam surface engaging said cam follower when in the locking position, said cam when rotated forcing said follower out of contact with said cam and out of locking position.

3. The combination set forth in claim 1 wherein said locking means includes a spring biased cam follower pivotally secured to said valve opening means responsive to axial opening movement of said valve stem for pivoting into a locking position, and including a rotatable cam surface engaging said cam follower when in the locking position, said cam when rotated forcing said follower out of contact with said cam and out of said locking position.

4. The combination set forth in claim 1, wherein said measuring means comprises a turbine having blades extending into said passageway, said turbine including a shaft secured to a gear coupled to said releasable locking means.

5. The combination set forth in claim 1 wherein said locking means includes a spring biased cam follower pivotally secured to said valve opening means responsive to axial opening movement of said valve stem for pivoting into a locking position, and including a rotatable cam surface engaging said cam follower when in the locking position, said cam when rotated forcing said follower out of contact with said cam and out of said locking position, and wherein said measuring means comprises a turbine having blades extending into said passageway, said turbine including a shaft secured to a gear coupled to said releasable locking means.

6. The combination set forth in claim 2 including a dial secured to and rotatable with said cam and a pointer secured to and rotatable with said cam follower for indicating the volume of liquid to be measured by said valve system.

7. The combination set forth in claim 5 wherein said rotatable cam comprises a cam body having an interior cam surface and having gear teeth formed in the exterior thereof in engagement with the gear secured to the shaft of said measuring means.

8. The combination set forth in claim 7 including a dial secured to and rotatable with said cam and a pointer secured to and rotatable with said cam follower for indicating the volume of liquid to be measured by said valve system.

References Cited

UNITED STATES PATENTS 1,857,627   5/1932   Elder _____ 222—20

STANLEY TOLLBERG, Primary Examiner